United States Patent
Yeoman et al.

[11] Patent Number: 5,914,011
[45] Date of Patent: Jun. 22, 1999

[54] CATALYTIC REACTION AND MASS TRANSFER STRUCTURE

[75] Inventors: Neil Yeoman, Merrick, N.Y.; Ronald Pinaire, Wichita, Kans.; Michael A. Ulowetz, Wichita, Kans.; O. Jeffrey Berven, Wichita, Kans.; Timothy P. Nace, Wichita, Kans.; David A. Furse, Wichita, Kans.

[73] Assignee: Koch-Glitsch, Inc., Wichita, Kans.

[21] Appl. No.: 08/440,820

[22] Filed: May 15, 1995

Related U.S. Application Data

[60] Division of application No. 07/962,498, Oct. 16, 1992, Pat. No. 5,447,609, which is a continuation-in-part of application No. 07/775,010, Oct. 11, 1991, Pat. No. 5,291,989, which is a continuation of application No. 07/475,971, Feb. 6, 1990, Pat. No. 5,108,550.

[51] Int. Cl.$^6$ .................................. B01D 3/00; B01J 8/04
[52] U.S. Cl. ............................. 202/158; 202/242; 261/97; 261/110; 422/190; 422/191; 422/193
[58] Field of Search ..................................... 202/158, 242; 203/29, DIG. 6; 261/97, 103, 114.4, 106, 110, 114.1, DIG. 72; 422/190, 189, 193, 216, 194–195, 191

[56] References Cited

U.S. PATENT DOCUMENTS

| | | |
|---|---|---|
| 2,676,875 | 4/1954 | Barr . |
| 3,541,000 | 11/1970 | Hanson et al. . |
| 3,629,478 | 12/1971 | Haunschild . |
| 3,634,535 | 1/1972 | Haunschild . |
| 3,882,167 | 5/1975 | Lohmar et al. . |
| 4,126,539 | 11/1978 | Derr, Jr. et al. . |
| 4,126,540 | 11/1978 | Grosboll et al. .......................... 261/97 |
| 4,159,291 | 6/1979 | Bruckert et al. ........................ 202/158 |
| 4,213,847 | 7/1980 | Chen et al. . |
| 4,302,356 | 11/1981 | Smith, Jr. . |
| 4,307,254 | 12/1981 | Smith, Jr. . |
| 4,439,350 | 3/1994 | Jones, Jr. . |
| 4,443,559 | 4/1994 | Smith, Jr. . |
| 4,471,154 | 9/1984 | Franklin . |
| 4,499,035 | 2/1985 | Kirkpatrick et al. ................. 261/114.1 |
| 4,540,831 | 9/1985 | Briggs . |
| 4,569,364 | 2/1986 | Keller et al. ............................. 202/158 |
| 4,579,647 | 4/1986 | Smith . |
| 4,620,952 | 11/1986 | Hsieh . |
| 4,623,454 | 11/1986 | Tauscher et al. . |
| 4,722,780 | 2/1988 | Franck et al. . |
| 4,731,229 | 3/1988 | Sperandio . |
| 4,836,989 | 6/1989 | Aly et al. . |

(List continued on next page.)

FOREIGN PATENT DOCUMENTS

| | | |
|---|---|---|
| 402019 | 12/1990 | European Pat. Off. . |
| 0470655 | 2/1992 | European Pat. Off. . |
| 2437239 | 4/1980 | France . |
| 872938 | 4/1953 | Germany . |
| 0598617 | 3/1978 | U.S.S.R. .................................. 261/97 |
| 2034597 | 6/1980 | United Kingdom . |
| 2232365 | 12/1990 | United Kingdom . |

OTHER PUBLICATIONS

*Patent Abstracts of Japan*, vol. 8, No. 279 (C–257)[1716], Dec. 20th, 1984; & JP–A–59 147 632 (Mitsui Zousen Engineering) Aug. 24, 1984.

*Primary Examiner*—Virginia Manoharan
*Attorney, Agent, or Firm*—Shook, Hardy & Bacon L.L.P.

[57] ABSTRACT

A reaction with distillation column is provided with a plurality of discrete catalytic reaction containers. The containers contain a plurality of solid catalyst particles which form a catalytic reaction zone. The containers also include a liquid collection tray cover which defines a liquid accumulation zone immediately overlying the catalytic reaction zone. Overflow weirs are provided on the tray cover to allow for overflow of liquid on the tray cover. A member may be provided within the containers to create an open area within the catalytic reaction zone to facilitate entry of the liquid into the catalytic reaction zone. The containers can be individually positioned within the reactor to suit particular process requirements.

30 Claims, 3 Drawing Sheets

U.S. PATENT DOCUMENTS

| | | |
|---|---|---|
| 4,839,108 | 6/1989 | Silvey . |
| 4,847,431 | 7/1989 | Nocca et al. . |
| 4,978,807 | 12/1990 | Smith, Jr. . |
| 5,026,459 | 6/1991 | Quang . |
| 5,073,236 | 12/1991 | Gelbein et al. . |
| 5,098,615 | 3/1992 | Resetarits . |
| 5,106,556 | 4/1992 | Binkley et al. ............ 261/114.1 |
| 5,108,550 | 4/1992 | Pinaire et al. . |
| 5,141,861 | 8/1992 | Dale . |
| 5,192,465 | 3/1993 | Petrich et al. ............ 261/97 |
| 5,291,989 | 3/1994 | Pinaire et al. ............ 202/158 |
| 5,308,451 | 5/1994 | Carland ............ 203/29 |
| 5,308,592 | 5/1994 | Yang et al. . |
| 5,366,666 | 11/1994 | Chuang et al. ............ 261/114.1 |
| 5,407,605 | 4/1995 | Resetarits et al. ............ 261/114.1 |
| 5,496,446 | 3/1996 | Yeoman et al. ............ 202/158 |
| 5,618,473 | 4/1997 | Sauter et al. ............ 261/114.1 |
| 5,632,962 | 5/1997 | Baker et al. ............ 261/97 |

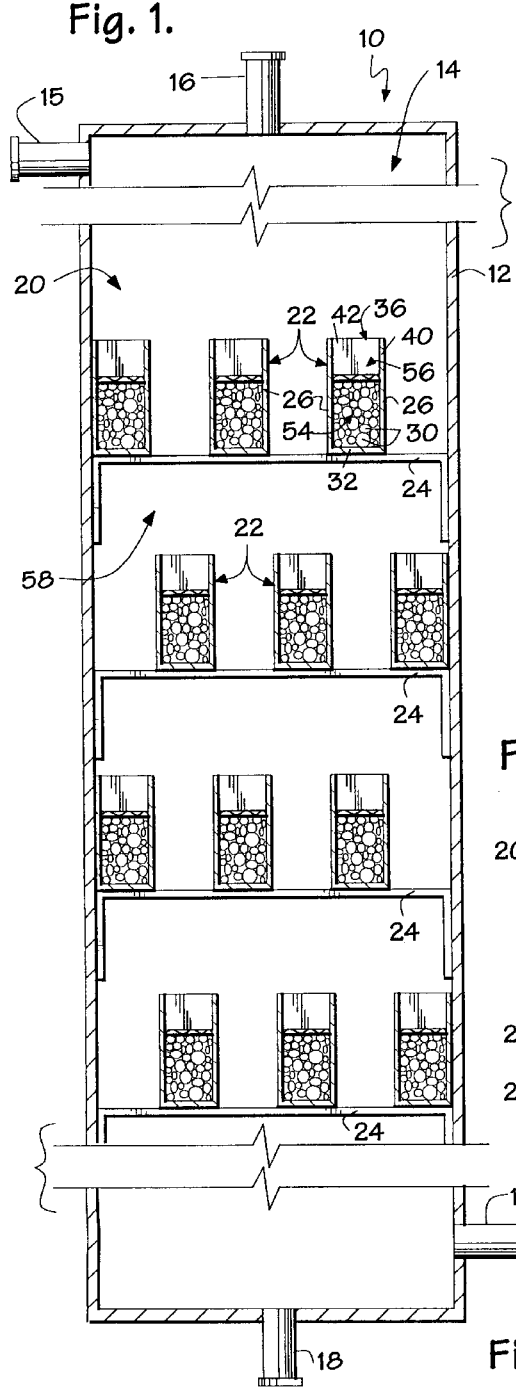
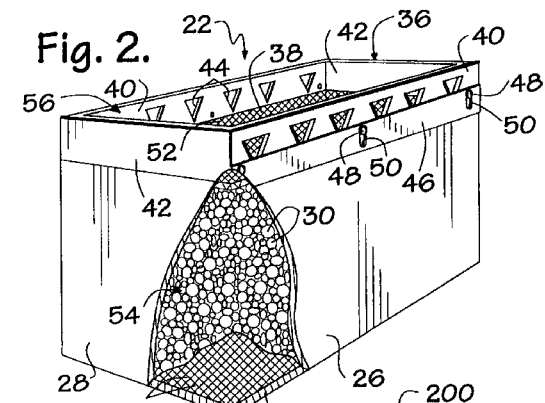
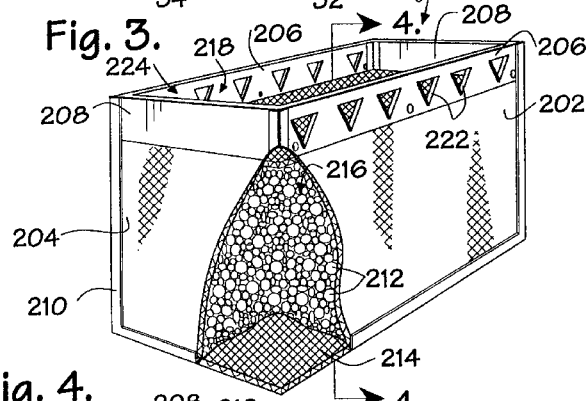
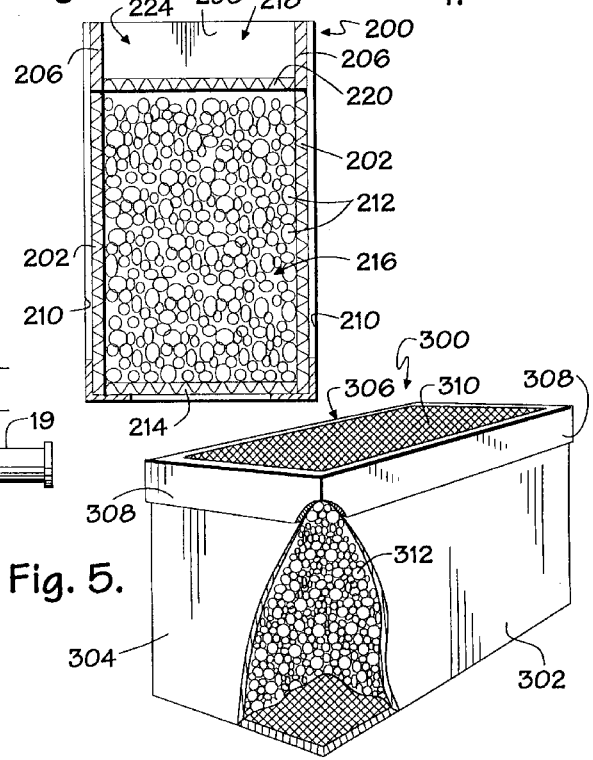
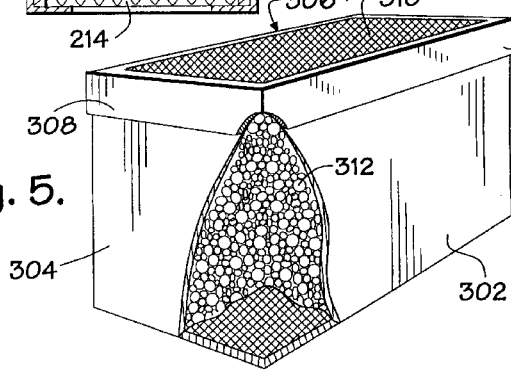

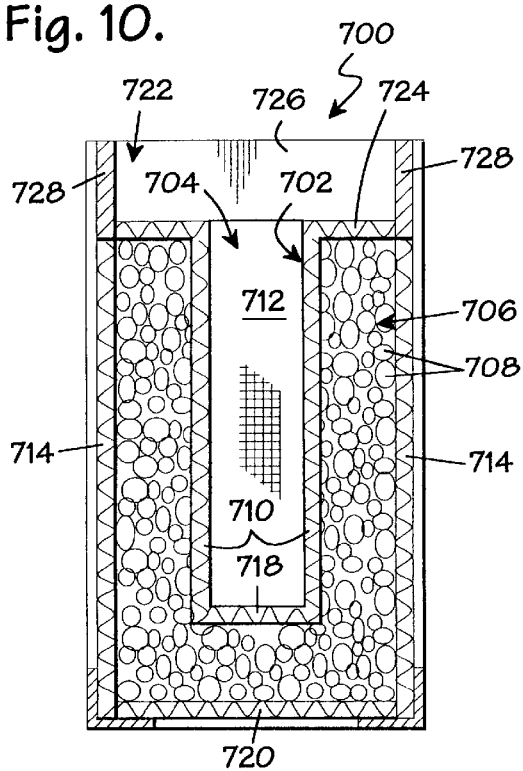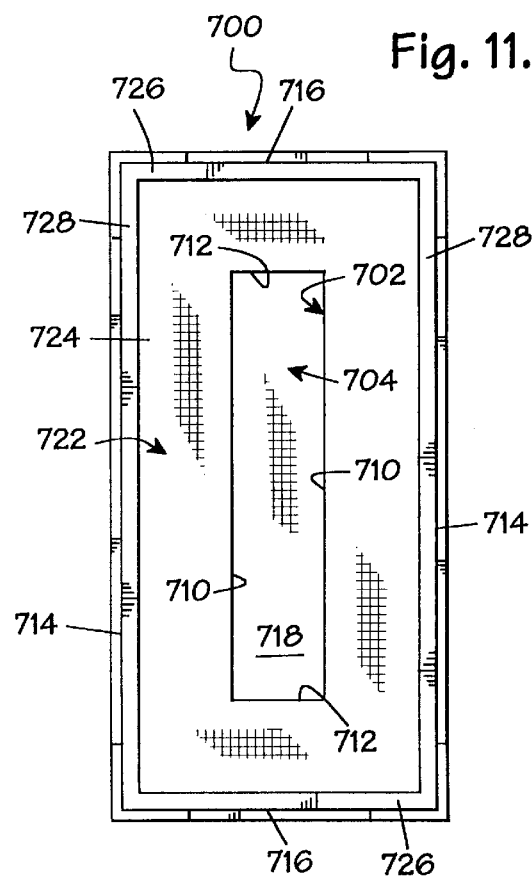

CATALYTIC REACTION AND MASS TRANSFER STRUCTURE

This is a division of U.S. application Ser. No. 07/962,498, filed Oct. 16, 1992, now U.S. Pat. No. 5,447,609, which is a continuation-in-part of U.S. application Ser. No. 07/775,010, filed Oct. 11, 1991, now U.S. Pat. No. 5,291,989, which is a continuation of U.S. application Ser. No. 07/475,971, filed Feb. 6, 1990, now U.S. Pat. No. 5,108,550.

BACKGROUND OF THE INVENTION

The present invention relates in general to reaction with distillation columns wherein mass transfer and chemical reaction occur within the same general region and, more particularly, to a structure within that region for containing solid catalyst particles which cause the chemical reaction to occur. The invention also relates to a reaction process employing a plurality of such structures.

Conventional catalytic reaction structures include containers which are filled with solid catalyst particles and are arrayed within a distillation column reactor. One example of a structure of this type, as disclosed in U.S. Pat. No. 4,307,254, comprises a cloth belt having a plurality of pockets which contain the catalyst particles and which are supported within the reactor by a steel wire support structure. The hydraulic characteristics of a reaction with distillation process which employs the cloth belt can be desirable because the liquid stream is free to flow through the open areas surrounding the cloth belt. The catalyst effectiveness or reactivity, however, may be inadequate in certain applications because the liquid is not forced to flow through the catalyst but instead merely diffuses through the catalyst after soaking through the cloth covering.

In other applications in which the cloth belt is used, the column region containing the cloth belt may be flooded with liquid to a preselected level in order to enhance the catalytic reaction of the liquid stream. Because the flooded conditions produce a large volume of backmixed liquid in that portion of the column, mass transfer between the liquid and vapor streams is substantially impeded. Provisions must then be made for allowing distillation to occur elsewhere within the column. The cloth belt in those applications thus functions primarily as a reaction structure and not a combination reaction with distillation structure.

Other types of catalytic distillation structures are disclosed in U.S. Pat. No. 5,057,468. The structures disclosed in that patent generally comprise cylindrical containers which hold catalyst and are provided with variously shaped openings for allowing passage of liquid and vapor through the containers. While the cylindrical containers can be more durable and easier to position than the cloth belt structures previous described, catalytic reaction still typically occurs primarily on the outer portions of the catalyst bed within each container because no mechanism is provided for forcing the liquid stream through the catalyst.

SUMMARY OF THE INVENTION

It is an object of this invention to provide individual catalyst-holding containers which can be readily positioned within a reaction with distillation column to provide preselected liquid and vapor flow patterns within a region of the reactor in order to achieve the desired processing efficiency for a reaction with distillation process occurring within that region of the column and which containers also include a mechanism for forcing liquid through the catalyst for increased catalytic efficiency.

It is also an object of this invention to provide individual catalyst-holding containers of the type described which can be easily repositioned within a reaction with distillation column to vary the liquid and vapor flow patterns within a region of the column to achieve the desired processing efficiency.

It is another object of this invention to provide individual catalyst-holding containers of the type described for placement within a reaction with distillation region of a column and which can be individually removed from the reactor, if desired, so that the catalyst within the containers can be more easily replaced without having to remove all of the containers as one unit.

It is a further object of this invention to provide a container for use in a reaction with distillation column to hold a quantity of a catalyst to form a catalytic reaction zone and which container also includes an overlying tray cover for accumulating liquid so that liquid can be preferentially directed into the catalytic reaction zone, including at an increased flow rate, to enhance the contact between the liquid and catalyst.

It is yet another object of this invention to provide a catalyst retaining container for use in a reaction with distillation column for catalytic reaction of a liquid stream, and which container also includes a liquid collecting tray cover which allows a portion of the liquid stream to be directed through the catalytic reaction zone formed by the catalyst while another portion of the liquid stream is allowed to overflow the tray cover and enter a surrounding mass transfer zone so that additional vapor-liquid interaction and mass transfer can take place between the overflowing liquid and a vapor stream.

It is a further object of this invention to provide a container of the type described which allows the quantity of liquid that accumulates in the liquid collecting tray cover to be readily varied, thereby allowing the containers to be used for various types of reaction with distillation processes while achieving the desired processing control.

It is a still further object of this invention to provide a method for operating a reaction with distillation column to allow concurrent (i) catalytic reaction of a portion of a liquid stream encountering a container having a catalytic reaction zone, and (ii) mass transfer between another portion of the liquid stream and a vapor stream, so that enhanced mass transfer can be achieved.

It is another object of this invention to provide a container which holds a catalyst bed and which provides an open area inside of the catalyst bed into which liquid may be directed for accumulation so that more effective contact between the liquid and the catalyst may be achieved as the liquid flows through the catalyst bed to exit the container.

It is yet another object of this invention to provide a container holding a catalyst bed and having an area within the catalyst bed which is open at the top to allow liquid to enter and accumulate within the area so that at least a portion of it is forced to flow laterally through the surrounding catalyst bed under increased pressure for more effective contact between the liquid and catalyst.

To accomplish these and other related objects of the invention, in one aspect the invention is related to a container for placement in a region of a reaction with distillation column, said container comprising:

a peripheral side wall defining an interior cavity sized for containing a plurality of solid catalyst particles which form a catalytic reaction zone within the container;

a bottom panel joined to the peripheral side wall to retain the solid catalyst particles within the interior cavity;

a tray cover coupled with the peripheral side wall and overlying the interior cavity for collecting liquid, said tray cover having a perforate panel to allow passage of liquid from the tray cover to the catalytic reaction zone.

In one embodiment, the tray cover has upstanding walls positioned along a periphery of the perforate panel. The walls are of a height to allow liquid to accumulate to a desired depth on the tray cover and, optionally, allow for overflow of liquid from the tray cover. In another embodiment, the tray cover is optional and the container includes a member spaced inwardly from the peripheral side wall of the container for presenting an open area within said catalytic reaction zone when the catalytic reaction zone is present in the container, said member being permeable to allow radial flow of liquid from the open area into the surrounding catalytic reaction zone. The member may have an upper end which is permeable to the flow of a liquid to facilitate passage of liquid into the open area and a lower end which has a permeability less than that of the upper end to facilitate radial flow of the liquid from the open area.

In another aspect, the invention encompasses a reaction with distillation column containing a plurality of such containers in a combination mass transfer and reaction region of the column, preferably arrayed in vertically spaced layers with containers within each layer extending in a generally parallel orientation and with containers in one layer extending longitudinally at an angle of between 0 and 90 degrees in relation to a longitudinal orientation of containers in an adjacent layer. Desirably, the containers are also positioned so that containers in one layer at least partially overlie an open space between containers in the underlying layer so that a vapor stream flowing upwardly through the open space will be at least partially blocked by the overlying containers and will be forced to flow around those containers.

In a still further aspect, the invention is directed to the use of the containers in a process of operating a mass transfer column structure for concurrent catalytic reaction of a liquid stream and mass transfer between the liquid stream and a vapor stream. The process comprises the steps of:

supplying a plurality of the containers within a reaction with distillation region in the open interior of the column structure;

passing the vapor stream upwardly through a mass transfer zone within the region;

directing the liquid stream to the region and directing at least a portion of the liquid stream onto a tray cover of one of said containers at a flow rate sufficient to cause the liquid stream to accumulate on the tray cover;

passing a first portion of the liquid stream on the tray cover through a perforate panel of the tray cover and into an underlying catalytic reaction zone and catalytically reacting said first portion of the liquid stream in the catalytic reaction zone to form a reaction product;

directing said first portion of the liquid stream containing said reaction product from the container and into said mass transfer zone for interaction with the vapor stream;

directing at least part of said first portion of the liquid stream from the mass transfer zone to another one of said containers for additional catalytic reaction and subsequent mass transfer; and withdrawing the products of catalytic reaction and mass transfer from the reaction with mass transfer region.

Additionally, the process may include the step of regulating the liquid stream to cause accumulation of a portion of the liquid stream on said tray covers to a level whereby a second portion of the liquid stream overflows the tray cover and enters the mass transfer zone for interaction with the vapor stream.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a reaction with distillation column in accordance with the present invention and taken in vertical section;

FIG. 2 is an enlarged perspective view of a catalytic reaction container in accordance with the present invention and of the type shown supported within the reactor in FIG. 1, portions of the peripheral wall of the container being broken away to show the solid catalyst particles positioned within the container;

FIG. 3 is a perspective view of an alternate embodiment of a catalytic reaction container similar to that shown in FIG. 2, but with the peripheral wall being formed from perforate rather than imperforate material, and portions of the wall being broken away to show the solid catalyst particles contained therewithin;

FIG. 4 is an end elevational view of the catalytic reaction container illustrated in FIG. 3 and taken in vertical section along line 4—4 of FIG. 3 in the direction of the arrows;

FIG. 5 is a perspective view of a still further embodiment of a catalytic reaction container, portions of the peripheral wall of the container being broken away to show the solid catalyst particles contained therein;

FIG. 10 is an end elevational view taken in vertical section of an alternate embodiment of a catalytic reaction container which has the same external configuration as the container illustrated in FIG. 3 but includes a member which provides an open area within a catalyst bed; and FIG. 11 is a top plan view of the container illustrated in FIG. 10.

DESCRIPTION OF THE PREFERRED EMBODIMENTS

Figure 6:
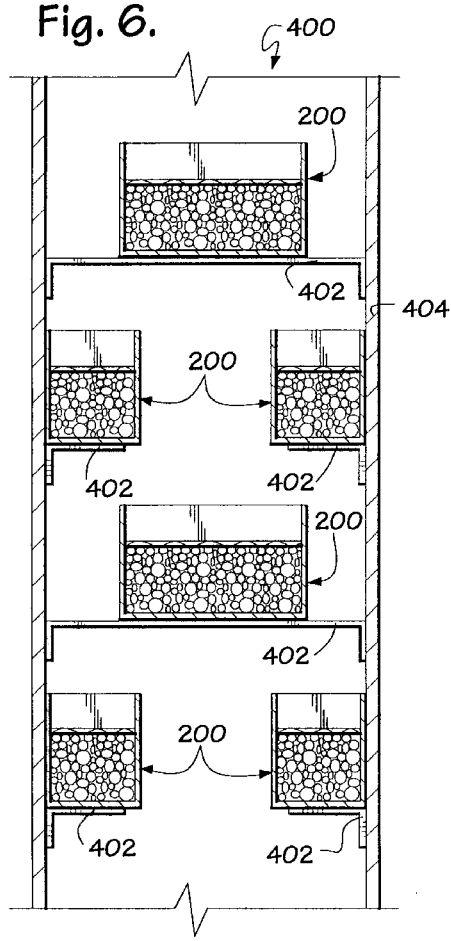
FIG. 6 is a fragmentary side elevational view taken in vertical section of a reaction with distillation column similar to that shown in FIG. 1 but with the catalytic reaction containers being positioned in a different pattern than that shown in FIG. 1.

Referring now to the drawings in greater detail and initially to FIG. 1, a reaction with distillation column in accordance with the present invention is represented broadly by the numeral 10. Column 10 may be any of various types of distillation columns or mass transfer reactors having a general region in which both mass transfer and chemical reaction occur, preferably concurrently. Typically, the column 10 will include one or more other zones or regions in which other processing such as distillation and/or other mass transfer processes occur. The additional regions may be above and/or below the reaction with mass transfer region.

Column 10 comprises an external upright shell 12 which may be of cylindrical, rectilinear or other desired configuration and defines a generally open internal chamber 14. Column 10 includes an upper inlet pipe 15 for directing a fluid stream, typically a liquid stream, within the shell 12 and into an upper portion of chamber 14. An upper outlet pipe 16 is provided for removing a vapor stream from column 10. Another outlet pipe 18 is provided at the bottom of shell 12 for removing a fluid stream from the column 10. An inlet pipe 19 may also be provided at the bottom of the column 10 for introducing a fluid such as a vapor stream into the column.

The column 10 includes a reaction with distillation region 20 that forms a portion of the internal chamber 14. The internal chamber 14 may include various other types of zones or regions in addition to region 20. For example, multiple reaction with distillation regions 20 may be utilized and regions in which only distillation occurs may be provided above and/or below the reaction with distillation region(s) 20. This is contemplated by and is within the scope of the invention.

A distributor (not shown) will typically be utilized to feed a liquid stream into the reaction with distillation region 20. If a distillation region is provided above region 20, any of various suitable types of collectors will be used to feed the liquid stream to the distributor. Likewise, the liquid stream leaving the region 20 will typically be collected by a device which feeds an underlying region such as a distillation zone.

A plurality of containers 22 constructed in accordance with the present invention are positioned within reaction with distillation region 20 on supports 24 which are suitably mounted within the shell 12. The supports 24 are constructed and arranged so that they will not substantially interfere with liquid flowing from containers 22 or fluids otherwise flowing within the region 20.

Turning additionally to FIG. 2, it can be seen that each of containers 22 includes upright side walls 26 and end walls 28 which are joined together to form a generally rectilinear peripheral side wall which defines an enclosure in which a plurality of solid catalyst particles 30 are maintained. The configuration of containers 22 is not limited to being rectilinear but may include cylindrical and other configurations as well. The peripheral walls 26 and 28 are formed of an imperforate material which is suitable for withstanding the conditions within reactor 10 and is rigid enough to contain the catalyst particles 30. Various types of metals are well suited for this purpose.

A perforate bottom panel 32 is connected to the peripheral walls 26 and 28 of container 22 to enclose the bottom thereof and to support the catalyst particles 30. The bottom panel 32 can be formed from various types of mesh or other suitable material having intersticial openings 34 sized for allowing passage of fluids but preventing passage of the catalyst particles 30.

The container 22 also includes a liquid collection tray cover 36 which is positioned on peripheral walls 26 and 28 and overlies the catalyst particles 30. The tray cover 36 comprises a horizontally disposed perforate panel 38 and upstanding wall extensions 40 and 42 at the periphery of panel 38. The wall extensions 40 and 42 may be formed either separately from or integrally with the associated lower walls 26 and 28. Preferably, the wall extensions 40 and 42 extend upwardly from the upper edge of lower walls 26 and 28 and are co-planer therewith. The wall extensions may be constructed from the same material used for the lower walls 26 and 28.

The tray cover 36 is constructed to allow the accumulation of liquid on the tray cover to form a liquid reservoir at predetermined liquid flow rates. The major wall extensions 40 function in part as overflow weirs and include a mechanism for controlling liquid flow, such as a plurality of triangular-shaped overflow apertures 44 which permit liquid to overflow the tray cover 36 when the liquid level reaches the apertures 44. Other aperture shapes can also be used and, if desired, the apertures can extend to the top edge of the wall extensions 40 to form notches which are open at their upper ends. As illustrated, the apertures 44 are uniformly spaced along wall extensions 40 and are oriented so that an apex of the triangular-shaped aperture is closest to the perforate bottom panel 38 of the tray cover 36. The apertures are vertically spaced above the panel 38 to obtain the desired liquid level on tray cover 36 before the liquid overflows through apertures 44. Alternatively, in some applications it may be desirable to omit the apertures 44 from the wall extensions 40. In such applications, liquid would simply overflow the top edges of the wall extensions.

It can be seen that the liquid accumulating on tray cover 36 creates a head of liquid which forces the liquid through the catalyst particles 30 in the container 22 at a flow rate that increases with increasing liquid head. In certain applications, this ability to force more liquid through the catalyst greatly increases the efficiency of the reaction process as more unreacted liquid is presented to the catalyst and the reaction products are flushed from contact with the catalyst at a faster rate so that they do not interfere with the reaction process.

The total open area provided by apertures 44 is set to achieve the desired volumetric overflow of liquid from the tray cover 36. The liquid level on the tray cover 36 and the open area of apertures 44 can be varied by vertical movement of a sliding plate 46 which can be moved to block a portion of the apertures 44. The sliding plate 46 is secured to an outer face of one of wall extensions 40 by an adjustable fastener such as a series of screws 48 which are received within slots 50 formed in the sliding plate 46. The plate 46 can be moved to the desired position in which a bottom portion of each of the apertures 44 is blocked and the plate is then secured in that position by tightening of the screws 48. The plate 46 thus can be used to quickly and easily increase the liquid head created by liquid accumulating on tray cover 36 by raising the level at which the liquid overflows through the apertures 44. Another sliding plate (not shown) can be secured to the opposite wall extension 40 and adjusted to the same or different height as plate 46.

The perforate panel 38 of liquid collection tray cover 36 overlies the solid catalyst particles 30 and is suitably secured to either the lower walls 26 and 28 or wall extensions 40 and 42. Desirably, the container 22 is constructed so that the panel 38 and optionally the wall extensions 40 and 42 can be removed to allow for loading and removal of the catalyst particles 30 within the container 22. Preferably, the panel 38 and wall extensions 40 and 42 are removable as an integral unit. The panel 38 may be formed from a mesh or other suitable material having interstitial openings 52 which allow downward passage of liquid from the tray cover 36 to cause wetting and flushing of the underlying catalyst particles 30. The panel 38 also serves as a cover to retain the catalyst particles 30 within the enclosure formed by walls 26 and 28 and bottom panel 32, so the openings 52 are sized to prevent passage of the catalyst particles.

The solid catalyst particles 30 may be formed of any suitable catalyst desired for a particular catalytic reaction process. The catalyst may be an acidic or basic catalyst or may comprise catalytic metals and their oxides, halides or other chemically reacted states. Molecular sieves may also be utilized as the catalyst. The catalyst chosen should be heterogeneous with the system reaction and the fluids charged to the column. By way of example, acid cation exchange resins may be used for dimerization, polymerization, etherification, esterification, isomerization, and alkylation reactions. Other catalysts such as molecular sieves, magnesia, chromia and brucite may be used for isomerization reactions.

The solid catalyst particles 30 can be a cylindrically shaped extrudate or in the form of small beads or the like or may comprise irregularly shaped granules or fragments. The term "particulate" as used herein is intended to encompass all of the foregoing. The size of the catalyst particles may be varied depending upon the requirements of the particular applications.

The catalyst particles 30 are loaded into each container 22 to the desired level to form a permeable catalytic reaction zone 54 within the container which allows for the passage of the downward flowing liquid. The catalytic reaction zone 54 within each container 22 immediately underlies and is in communication with a liquid accumulation zone 56 which is defined by the liquid collection tray cover 36. Preferably, any liquid entering the catalytic reaction zone 54 in any container 22 must first pass through the perforate panel 38 in the overlying tray cover 36 of that container.

It can be seen that each container 22 provides discrete catalytic reaction and liquid accumulation zones 54 and 56, respectively, which are in direct communication so that a portion or all of the liquid on the tray cover 36 is passed directly into the catalytic reaction zone 54. The zones 54 and 56 in each container are also separate and independent of the similar zones in the other containers 22 so that each container may be positioned generally independently of the other containers.

Liquid which flows into the catalytic reaction zone 54 of a container 22 passes downwardly through zone 54 and undergoes the desired catalytic reaction. The reacted liquid is then forced from the container 22 through the perforate bottom panel 32 and enters a surrounding mass transfer zone 58 for mass transfer with a vapor stream which has been charged to the reactor 10 or has been generated within the reactor 10. Mass transfer zone 58 generally comprises the open volume within region 20 which is not occupied by containers 22.

Optionally, a portion of the liquid in the liquid accumulation zone 56 does not enter the catalytic reaction zone 54 but overflows the tray cover 36 in either a continuous or discontinuous sheet and enters the mass transfer zone 58 for interaction with the vapor stream. This liquid overflow thus allows a greater quantity of liquid to be charged to the reaction with distillation region 20 and, hence, the mass transfer zone 58 than could otherwise be accommodated if all of the liquid were forced to flow through the catalytic reaction zone 54. Mass transfer is also facilitated because the liquid is more effectively distributed through the zone 58.

This enhanced distribution results from the liquid overflowing from the sides of containers 22 and entering the open area between the containers instead of only exiting through the bottom panels 32 of the containers. Mass transfer is further enhanced when the liquid overflow is at a rate sufficient to cause a continuous sheet of liquid extending outwardly from the sides of the containers 22. The liquid sheet then acts as a barrier through which the vapor stream must pass, thereby resulting in more intimate contact between the liquid and vapor.

It will be appreciated that in certain applications it may not be necessary or desirable for the liquid to overflow the tray covers 36. The wall extensions 40 and 42 in such applications would be of a sufficient height to create a liquid head which will drive all of the liquid entering the tray cover 36 through the catalytic reaction zone 54 at an increased rate and, typically, with increased reaction efficiencies.

The arrangement of containers 22 within column 10 is selected to achieve the desired distillation and process efficiency. As is best shown in FIG. 1, the containers 22 are arrayed in a plurality of rows at different levels within the reaction with distillation region 20 of the column 10. Each row may be formed from a single container which extends between the opposed walls of shell 12 or two or more containers may be placed end-to-end to form each row. The rows within each level extend generally parallel to each other and extend at an angle of between 0 and 90 degrees in relation to the rows of containers in an adjacent level. As shown in FIG. 1, the rows in adjacent levels extend at an angle of 0 degrees, or parallel to each other. It is also preferred that the rows of containers in one level at least partially overlie or underlie the open space between container rows in adjacent levels. As illustrated, the container rows completely overlie the open space in the adjacent level so that the vapor stream flowing vertically through an open space in one layer is forced to travel horizontally to pass around the containers in the next layer.

The container arrangement illustrated in FIG. 1 is also desirable because overflowing liquid will generally be directed to the liquid collection tray covers 36 in the next layer of containers 22 while the liquid which has passed through the catalytic reaction zone 54 will generally fall through the open space between the containers in the next layer and will enter the tray covers 36 in the next underlying layer of containers 22. The catalytically reacted liquid is thus able to bypass the immediately underlying layer of containers but the liquid which has not passed through the catalytic reaction zone 54 is preferentially channeled to the immediately underlying layer of containers where a portion of the liquid will be forced to pass through the catalytic reaction zone in those containers. Greater operating efficiencies can thus be achieved by this arrangement of containers.

In a method in accordance with the present invention, the containers 22 are positioned within the reaction with distillation region 20 and a fluid stream, preferably comprising a liquid stream, is charged to the column 10 such as through inlet pipe 15. The liquid stream may optionally pass through other regions such as distillation zones before it is collected and distributed to reaction with distillation region 20. A gas or vapor stream may optionally be introduced to region 20 such as from inlet 19 and through one or more intermediate regions. The liquid stream passes downwardly through region 20 and a portion of the liquid stream passes from one container 22 to one or more underlying containers which, depending upon the placement of the containers 22, may be at the next underlying level within zone 20 or may be at other underlying levels. Portions of the liquid stream that accumulate on the tray covers 36 of containers 22 are preferentially channeled through the catalytic reaction zone 54 while other portions are allowed to overflow the tray covers 36.

The portions of the fluid stream that enter the catalytic reaction zone 54 within the containers 22 undergo catalytic reaction and the concentration of the reaction product in the liquid stream will typically (but not always) increase as the liquid stream moves downwardly. The overflowing portions of the liquid stream as well as the catalytically reacted portions of the liquid stream enter the surrounding mass transfer zone 58 for interaction with the vapor stream to cause mass transfer between the liquid and vapor. The heavier reaction and mass transfer products can be removed from reactor 10 through bottom outlet pipe 18 or in other suitable fashions, while the more volatile components can be removed as an overhead in outlet 16.

The amount of the liquid stream entering the catalytic reaction zone 54 within containers 22 can be regulated by controlling the volumetric flow of the liquid stream charged to the mass transfer zone 20, as well as by varying the height of the sliding plates 46 to adjust the liquid head on tray covers 36. In most commercial applications it will be important to initially set the sliding plates 46 at the correct height to minimize the need for adjustments after startup. At some lower volumetric flow rates, substantially all of that portion of the liquid stream directed onto tray covers 36 will flow through the perforate bottom panel 38 of the tray cover and directly into the underlying catalytic reaction zone 54 of the same container. After passing completely through the catalyst zone, the liquid stream is then discharged through the perforate bottom panel 32 of the container. At relatively higher volumetric flow rates, i.e. those which exceed the permeability rate through the catalytic reaction zone 54, a portion of the liquid stream will accumulate on the tray covers 36 and will overflow through apertures 44 without passing through the catalytic reaction zone 54. The permeability rate of the liquid through the containers 22 can alternatively be controlled by the sizing of the interstitial openings 34 or 52 in either of panels 32 or 38 through which the liquid must flow or by adjusting the size and size distribution of the catalyst particles 30.

As the vapor stream passes upwardly, it flows through the zone 58 and around containers 22. The vapor stream contacts the liquid flowing from containers 22 and mixes therewith to cause mass transfer. Because the containers 22 are arrayed in a grid which blocks the vertical flow channels, the vapor stream must wind its way through the grid and more effective mass transfer is achieved. Notably, the vapor stream is forced to flow horizontally as well as vertically as it flows through the container grid. The vapor stream is thus forced to pass through a fluid stream coming out of the bottom of each container as well as that overflowing the sides of the containers.

The ratio of total catalytic reaction zone 54 to mass transfer zone 58 can be selected to meet the requirements of particular applications. As but one example, one-half of the total volume within region 20 can comprise mass transfer zone 58, with the catalytic reaction zone 54 comprising one-third and the liquid accumulation zone 56 comprising one-sixth of the total volume. These volumes can, of course, be varied to suit particular processing requirements. It will be appreciated that the reaction process can be varied from that described such as by utilizing several fluid streams carrying different components and/or by charging multiple vapor streams to the reactor 10. This is contemplated by and is within the scope of the invention.

Advantageously, the use of containers 22 within column 10 allows for greater control over the reaction process by providing discrete catalytic reaction zones 54 that can be separately removed or positioned within reactor 10. Moreover, because the containers 22 can be easily removed from the reactor 10, the quantity of catalyst particles 30 within any particular container can be varied by removing only that container instead of having to remove all of the containers. The easy removal of the containers 22 also makes it more convenient to renew the catalyst particles 30 contained therein. Because of the low cost of containers 22, they are particularly well suited for processes such as those for the production of MTBE.

Turning now to FIG. 3–4, an alternate embodiment of a container is represented broadly by the number 200. Container 200 is similar to container 22 previously described except it contains perforate side walls 202 and end walls 204 and, imperforate wall extensions 206 and 208. The walls 202 and 204 and wall extensions 206 and 208 are formed of suitable materials such as screen or mesh material for the walls and metal sheets for the wall extensions. A rigid frame 210 is used to support the walls and extensions.

The container 200 includes a plurality of solid catalyst particles 212 which are supported on a perforate bottom panel 214 which is connected to the walls 202 and 204. The catalyst particles 212 form a catalytic reaction zone 216 as previously described with respect to container 22. A liquid collection tray cover 218 is formed overlying the catalytic reaction zone 216 by the wall extensions 206 and 208 and a perforate panel 220 which is removable and also serves to retain the catalyst particles within zone 216. The wall extensions 206 include apertures 222 of the type previously described which allow for overflow of liquid from the tray cover 218. A sliding plate (not shown) similar to plate 46 described with respect to container 22 may be provided to block a portion of the apertures 222 to control the liquid accumulation level on the tray cover 218. Also as previously described, the tray cover 218 forms a liquid accumulation zone 224 which is in direct communication with catalytic reaction zone 216.

Another embodiment of a container is shown in FIG. 5 and is represented by the numeral 300. The container 300 is constructed with imperforate side walls 302 and end walls 304, although perforate walls could be used if desired. Container 300 includes a tray cover 306, which unlike those previously described, does not include upstanding wall extensions. Instead, downturned walls 308 or other mechanisms may optionally be provided to secure a panel 310 over the catalyst 312 contained within the container.

The containers 200 and 300 can be utilized in the same manner as containers 22 to allow for concurrent catalytic reaction and mass transfer of fluid stream(s) in discrete zones. One manner of placement of the containers 200 within a reaction with distillation column 400 is illustrated in FIG. 6. The containers 200 are placed on supports 402 mounted on a shell 404 of column 400 and are positioned in spaced apart rows at different levels within the column. As illustrated, containers 200 at one level are of a different width and are oriented with their longitudinal axes extending at an angle of 0 degrees from the longitudinal axes of the containers in the adjacent levels. The containers 200 thus form a layered grid structure such that a portion of the fluid flowing from a container at one level is directed to one or more containers 200 in the immediately underlying layer while another portion of the fluid is directed to one or more containers 200 in the next underlying layer.

Figure 7:
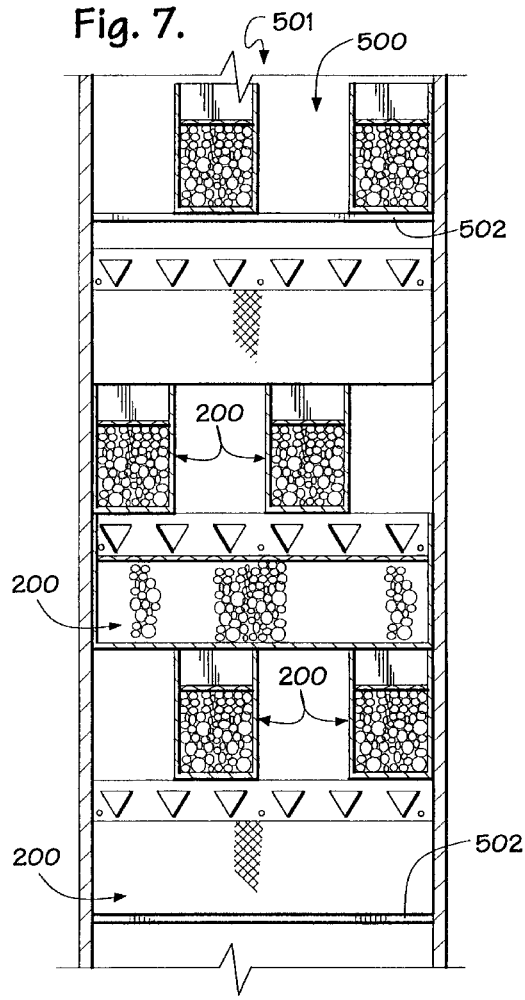
FIG. 7 is a fragmentary side elevational view taken in vertical section of a reaction with distillation column similar to that shown in FIG. 6 but utilizing the catalytic reaction containers of the type shown in FIG. 3 and showing them arranged in a still further pattern.

A further arrangement of containers 200 is shown in FIG. 7 wherein the containers 200 are stacked on top of each other within reaction with distillation region 500 in a column 501. A series of supports 502 are provided to support a number of stacked containers 200. Successive layers of containers 200 extend longitudinally at right angles to the orientation of the containers in adjacent layers. It is to be understood that various other angles may be suitable or desired for particular applications. Containers 200 in alternating layers are also offset to minimize the amount of liquid bypassing the containers at any level within column 501 and to force the upwardly flowing vapor to flow around the containers for improved liquid-vapor interaction.

Figure 8:
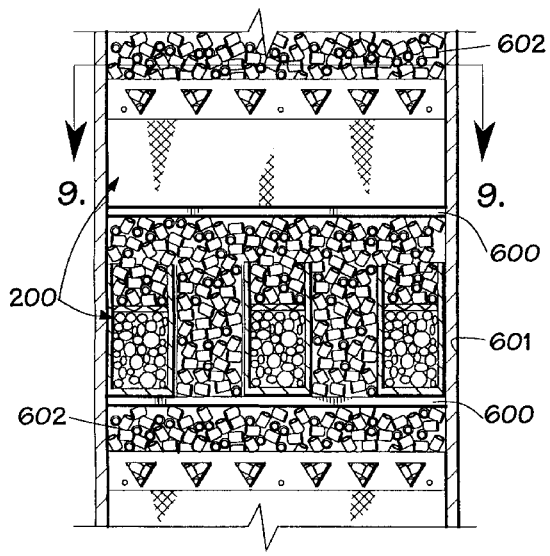
FIG. 8 is a fragmentary side elevational view of a reaction with distillation column similar to that shown in FIG. 7 but with the catalytic reaction containers being positioned in a still different pattern and with distillation packing being positioned surrounding the containers.
Figure 9:
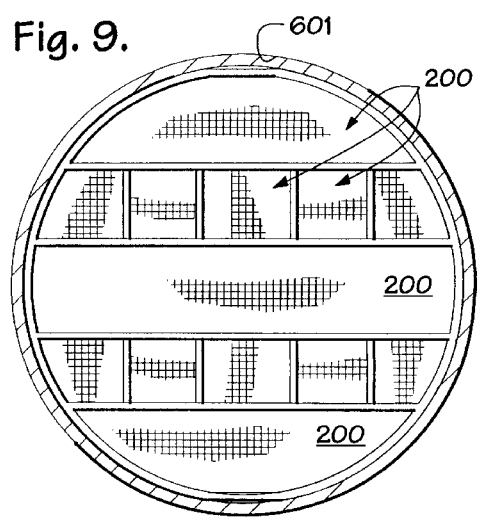
FIG. 9 is a top plan view of the reaction with distillation column of FIG. 8 taken in horizontal section along line 9—9 in FIG. 8 in the direction of the arrows and with the packing being removed to better illustrate the arrangement of the containers.

A still further arrangement of containers 200 is shown in FIGS. 8–9 wherein each layer of containers 200 is placed on a support 600 mounted on shell 601 and adjacent layers are arrayed at right angles. Packing 602 is provided in the mass transfer zone 604 around the containers 200 to facilitate mass transfer and distillation. The packing 602 is shown as being a ring type packing but it may comprise any of the various types of suitable plate-like or saddle type packing or other structures which are commercially available. It will be appreciated that packing 602 can greatly enhance the mass transfer between the liquid and vapor streams by causing more uniform distribution thereof and more intimate contact therebetween. As can be seen in FIG. 9, the containers at one level can be arranged in a staggered fashion to the containers two levels below so that the vertical passages are blocked and the ascending vapor stream must wind its way around the containers. In order to illustrate this arrangement, the packing 602 has not been shown in FIG. 9.

Turning now to FIGS. 10–11, a still further embodiment of a catalytic reaction container is shown and is broadly represented by the numeral 700. Containers 700 are constructed similarly to those containers previously described but include a member 702 which forms an area 704 within a bed 706 of catalyst particles 708 of the type previously described. The member 702 includes perforate side walls 710 and end walls 712 which are spaced inwardly from container side walls 714 and end walls 716 which are also perforate. The annular space between the member walls 710 and 712 and the container walls 714 and 716 is filled with catalyst particles 708. The member 702 also includes a bottom panel 718 which is connected to the side walls 710 and end walls 712 and is preferably spaced above a bottom panel 720 of the container 700. The region between the member bottom panel 718 and the container bottom panel 720 is likewise filled with catalyst particles 708.

The container 700 may optionally include a liquid collection tray cover 722 of the type previously described and defined by a horizontally disposed perforate panel 724 and upstanding wall extensions 726 and 728 at the periphery of panel 724. Alternatively, the wall extensions 726 and 728 may be omitted and the panel 724 would then be utilized simply to retain the catalyst particles 708 within the container 700. If utilized, the wall extensions 726 and 728 may include overflow apertures of the type described previously. That portion of the horizontal panel 724 which overlies the open area 704 within the catalyst bed may be removed as illustrated or it may be retained if desired.

The member 702 is preferably formed of mesh material which is sized to accommodate liquid flow between the catalyst bed 706 and the open area 704 but precludes the catalyst particles 708 from entering the open area 704. The bottom panel 718 of member 702 may, in some applications, be formed of imperforate material to prevent liquid from flowing through the bottom panel 718 and instead force all of the liquid entering the open area 704 to pass laterally through the member side walls 710 and end walls 712.

In use, containers 700 can be utilized in the same manner and have the same advantages as the containers previously described. In addition, the presence of member 702 which forms the open area 704 within the catalyst bed 706 allows liquid to enter and accumulate within area 704. Any liquid entering area 704 must then pass through the surrounding catalyst bed 706 before it can exit container 700. This results in more efficient utilization of the catalyst particles 708 by ensuring that liquid is distributed throughout the catalyst bed 706 rather than just flowing along the outer perimeter of the catalyst bed and diffusing into the bed. In addition, the liquid head developed by the liquid accumulating in the open area 704 forces the liquid into the surrounding catalyst bed 706 under increased pressure and at an increased flow rate. This flushing action removes the reaction product from contact with the catalyst particles 708 and continually presents fresh liquid to the catalyst particles for catalytic reaction, thereby further increasing the catalyst efficiency. By introducing the liquid into the open area 704 within the catalyst bed 706, the distance of travel of the liquid through the surrounding catalyst bed 706 is substantially less than if the open area were not provided. Because of the reduced distance of travel, the liquid encounters less resistance to flow and the pressure drop across the catalyst bed is reduced. Notably, this reduction in pressure drop is achieved while the catalytic efficiency is increased.

It can be appreciated that it is important that at least a portion, including most or substantially all, of the liquid which enters the open area 704 is forced to flow through the catalyst bed 706 before exiting the container 700 through the perforate walls 714 and 716 and bottom panel 720. This can be achieved in various ways, such as by spacing the member bottom panel 718 from the container bottom panel 720 and placing catalyst particles 708 in the space which is created, as illustrated in FIGS. 10–11. Such an arrangement would allow a portion of the liquid to flow downwardly through the member bottom panel 720 while another portion is forced to flow radially through the member walls 710 and 712. Alternatively, the container bottom panel 720 could be formed of imperforate material to prevent liquid from flowing through the panel 720. If this alternate construction is utilized, the open area 704 could be extended downward to the container bottom panel 720. Any liquid entering the open area 704 would then be forced to flow into the catalyst bed 706 through either the member side walls 710 or container end walls 712. Other constructions which achieve the same purpose are possible and are within the scope of the invention.

Because of the liquid head created by the accumulating liquid in open area 704, more force will be exerted on the liquid passing through the member bottom panel 718. The catalyst bed thickness below the bottom panel 718 can thus be sized greater than the thickness between the member walls 710 and 712 and the container walls 714 and 716 to maximize the catalyst efficiency. The catalyst efficiency can be further increased such as by inclining the member side walls 710 in a V-shaped arrangement which would eliminate the need for member bottom panel 718 and would cause the catalyst bed to be progressively wider as the bottom edges of the side walls 710 are approached.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A container for placement in a region of a distillation column, said container comprising:

a peripheral side wall defining an interior cavity containing a plurality of solid catalyst particles which form a catalytic reaction zone within the container;

a liquid permeable bottom panel joined to the peripheral side wall and underlying said interior cavity to retain the solid catalyst particles within the interior cavity while permitting the passage of liquid from the interior cavity downwardly through the bottom panel; and a tray cover for accumulating liquid and coupled with the peripheral side wall and overlying the interior cavity, said tray cover having a perforate panel and upstanding walls positioned along a periphery of the perforate panel, said upstanding walls being formed by a vertical extension of the peripheral side wall and being of a height to allow liquid to accumulate within the upstanding walls on the tray cover, said perforate panel being liquid permeable to allow at least a first portion of said liquid accumulated on the tray cover to pass downwardly through the tray cover and into the underlying catalytic reaction zone.

2. The container as set forth in claim 1, wherein at least one of said upstanding walls of the tray cover has an aperture for permitting overflow of another portion of the liquid accumulating on the tray cover.

3. The container as set forth in claim 2, wherein said peripheral side wall has a plurality of openings to allow for passage of liquid through the openings from within the container.

4. The container as set forth in claim 3, wherein said upstanding walls contain a plurality of openings for allowing passage of said another portion of the liquid through the openings.

5. The container as set forth in claim 1, wherein at least a portion of said tray cover is removable to allow for loading and unloading of said solid catalyst particles within said interior cavity.

6. The container as set forth in claim 1, wherein said bottom panel supports the catalyst.

7. The container as set forth in claim 1, including a member spaced inwardly from said peripheral side wall to form an open area within the catalytic reaction zone.

8. The container as set forth in claim 7, wherein said member has an upper end which is permeable to the flow of a liquid to facilitate passage of liquid into the open area and a lower end which has a permeability less than that of the upper end to facilitate radial flow of the liquid from the open area.

9. The container as set forth in claim 8, wherein the lower end of the member is spaced above the bottom panel of the container and some of the solid catalyst particles are placed in the region between the lower end of the member and the container bottom panel.

10. The container as set forth in claim 7, wherein said member has an upper end which is permeable to the flow of a liquid to facilitate passage of liquid into the open area and a lower end which is impermeable to the flow of said liquid to facilitate radial flow of the liquid from the open area.

11. The container as set forth in claim 7, wherein said member has a permeable side wall to permit liquid which is present in the open area to flow through the side wall and into the catalytic reaction zone.

12. A mass transfer with reaction column comprising:

an elongated upright column structure having an open interior region; and a plurality of catalytic reaction containers positioned within said open interior region, said catalytic reaction containers each having a peripheral side wall defining an interior cavity containing a plurality of solid catalyst particles forming a catalytic reaction zone and a perforate bottom panel joined to the peripheral side wall and underlying said interior cavity to permit the passage of a liquid from the interior cavity downwardly through the bottom of the container, each of said catalytic reaction containers including a liquid collection tray cover positioned on the peripheral side wall and overlying the interior cavity, said tray cover having a perforate panel and upstanding walls positioned along a periphery of the perforate panel, said upstanding walls being constructed to permit accumulation of liquid on the tray cover and said perforate panel being liquid permeable to allow at least a first portion of said liquid accumulated on the tray cover to pass downwardly through the tray cover and into the underlying catalytic reaction zone, said catalytic reaction containers being arrayed in a plurality of horizontally spaced rows in vertically spaced layers within the open interior region of the upright column structure.

13. The mass transfer with reaction column as set forth in claim 12, wherein said peripheral side wall is perforate to allow passage of liquid therethrough.

14. The mass transfer with reaction column as set forth in claim 13, wherein said container bottom panel supports the catalyst particles.

15. The mass transfer with reaction column as set forth in claim 13, wherein at least one of said upstanding walls of the tray cover has an aperture for permitting overflow of another portion, the liquid from the tray cover.

16. The mass transfer with reaction column as set forth in claim 15, wherein said container peripheral side wall has a plurality of openings to allow for passage of liquid through the openings from within the container.

17. The mass transfer with reaction column as set forth in claim 16, wherein said upstanding walls contain a plurality of openings for allowing passage of said another portion of the liquid through the openings.

18. The mass transfer with reaction column as set forth in claim 15, wherein at least a portion of said tray cover is removable to allow for loading and unloading of said solid catalyst particles within said interior cavity of at least one of said containers.

19. The mass transfer with reaction column as set forth in claim 18, wherein said containers in one layer at least partially overlap an open space between the containers in an adjacent layer.

20. The mass transfer with reaction column as set forth in claim 19, including packing in said open space between the containers.

21. The mass transfer with reaction column as set forth in claim 12, wherein said rows of containers in one layer extend at a right angle to the orientation of rows in an adjacent layer.

22. The mass transfer with reaction column as set forth in claim 12, wherein said rows of containers in one layer extend parallel to the orientation of rows in an adjacent layer.

23. The mass transfer with reaction column as set forth in claim 12, including a member spaced inwardly from said peripheral side wall of one of the containers to form an open area within the catalytic reaction zone in the container.

24. The mass transfer with reaction column as set forth in claim 23, wherein said member has an upper end which is permeable to the flow of liquid to facilitate passage of liquid from the tray cover into the open area and a lower end which is liquid impermeable or has a liquid permeability less than that of the upper end to facilitate radial flow of liquid from the open area.

25. The mass transfer with reaction column as set forth in claim 24, wherein the lower end of the member is spaced above the bottom of the container and a portion of the solid catalyst particles are placed in the region between the lower end of the member and the container bottom.

26. The mass transfer with reaction column as set forth in claim 25, wherein the lower end of the member is impermeable to the flow of said liquid.

27. The mass transfer with reaction column as set forth in claim 23, wherein said member has a permeable side wall to permit liquid which is present in the open area to flow through the side wall and into the catalytic reaction zone.

28. A container for placement in a region of a distillation column, said container comprising:

a peripheral side wall defining an interior cavity containing a plurality of solid catalyst particles which form a catalytic reaction zone within the container;

a liquid permeable bottom panel joined to the peripheral side wall and underlying said interior cavity to retain the solid catalyst particles within the interior cavity while permitting the passage of liquid from the interior cavity downwardly through the bottom panel; and a tray cover for accumulating liquid and coupled with the peripheral side wall and overlying the interior cavity, said tray cover having a perforate panel to allow passage of liquid downwardly through the tray cover and into the underlying catalytic reaction zone and upstanding walls positioned along a periphery of the perforate panel and formed by a vertical extension of the peripheral side wall, said upstanding walls being of a height to allow liquid to accumulate within the upstanding walls on the tray cover, wherein at least one of said upstanding walls of the tray cover has an aperture for permitting overflow of the liquid accumulating on the tray cover and wherein a slidable plate is mounted for blocking a portion of the aperture to prevent liquid overflow from the tray cover until the liquid reaches an unblocked portion of the aperture.

29. A mass transfer with reaction column comprising:

an elongated upright column structure having an open interior region; and a plurality of catalytic reaction containers positioned within said open interior region, said catalytic reaction containers each having a peripheral side wall defining an interior cavity containing a plurality of solid catalyst particles forming a catalytic reaction zone and a perforate bottom joined to the peripheral side wall and underlying said interior cavity to permit the passage of a liquid from the interior cavity downwardly through the bottom of the container, each of said catalytic reaction containers including a liquid collection tray cover coupled with the peripheral side wall and overlying the interior cavity, said tray cover having a perforate panel to allow passage of liquid downwardly through the tray cover and into the underlying catalytic reaction zone and upstanding walls positioned along a periphery of the perforate panel, said walls being constructed to permit accumulation of liquid on the tray cover, wherein at least one of said upstanding walls of the tray cover has an aperture for permitting overflow of the liquid accumulating on the tray cover and wherein a slidable plate is mounted for blocking a portion of the aperture to prevent liquid overflow from the tray cover until the liquid reaches an unblocked portion of the aperture, said catalytic reaction containers being arrayed in a plurality of horizontally spaced rows in vertically spaced layers within the open interior region of the upright column structure.

30. A mass transfer with reaction column comprising:

an elongated upright column structure having an open interior region; and a plurality of catalytic reaction containers arrayed in a plurality of horizontally spaced rows in vertically spaced layers within the open interior region of the upright column structure, each of said containers comprising:

a peripheral side wall defining an interior cavity containing a plurality of solid catalyst particles which form a catalytic reaction zone within the container;

a liquid permeable bottom panel joined to the peripheral side wall and underlying said interior cavity to retain the solid catalyst particles within the interior cavity while permitting the passage of liquid from the interior cavity downwardly through the bottom panel;

a tray cover for accumulating liquid and coupled with the peripheral side wall and overlying the interior cavity, said tray cover having a perforate panel and upstanding walls positioned along a periphery of the perforate panel, said upstanding walls being of a height to allow liquid to accumulate on the tray cover and said perforate panel being liquid permeable to allow at least a first portion of said liquid accumulated on the tray cover to pass downwardly through the tray cover and into the underlying catalytic reaction zone and the open area; and a member spaced inwardly from said peripheral side wall for presenting an open area within said catalytic reaction zone, said member having an upper end which is permeable to the flow of a liquid to facilitate passage of the liquid into the open area, a permeable side wall to permit liquid which is present in the open area to flow through the side wall and into the catalytic reaction zone, and a lower end which is impermeable or has permeability less than that of the upper end to facilitate radial flow of the liquid from the open area into the catalytic reaction zone, wherein at least one of said upstanding walls of the tray cover has an aperture for permitting overflow of the liquid accumulating on the tray cover and wherein a slidable plate is mounted for blocking a portion of the aperture to prevent liquid overflow from the tray cover until the liquid reaches an unblocked portion of the aperture.

* * * * *